Dec. 31, 1957  P. M. KROPP, JR  2,818,487
ADJUSTABLE CONTROL FOR AUTOMATIC ELECTRIC
COFFEE MAKER OR THE LIKE
Filed July 9, 1956  2 Sheets-Sheet 1

Inventor:
Paul M. Kropp, Jr.
by Armand Cifelli
His Attorney.

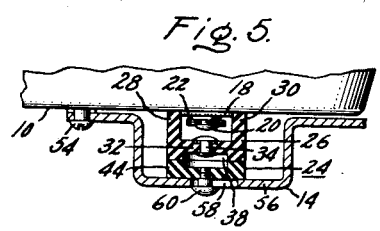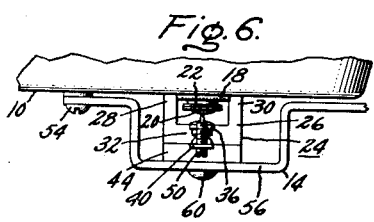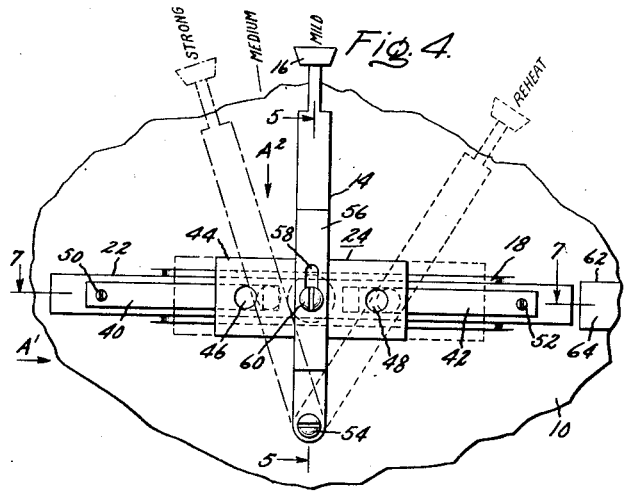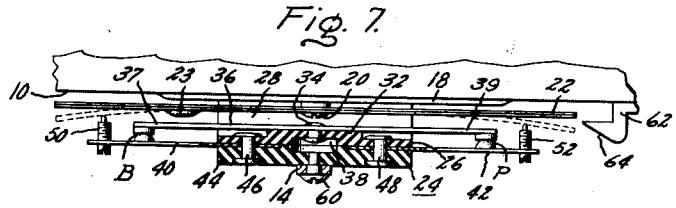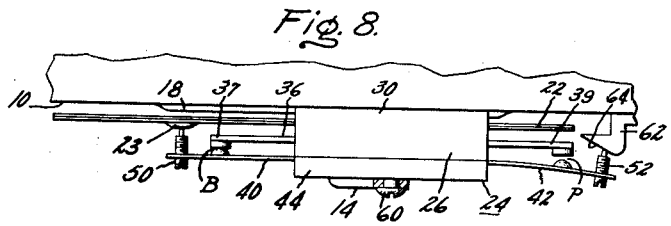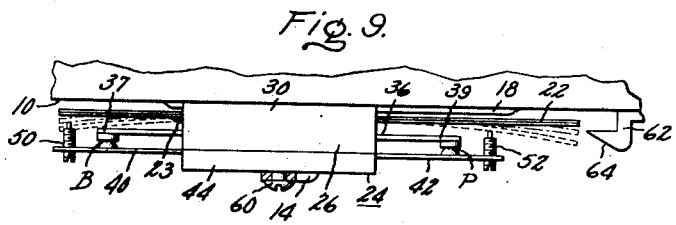

United States Patent Office 2,818,487
Patented Dec. 31, 1957

2,818,487

ADJUSTABLE CONTROL FOR AUTOMATIC ELECTRIC COFFEE MAKER OR THE LIKE

Paul Milton Kropp, Jr., Allentown, Pa., assignor to General Electric Company, a corporation of New York Application July 9, 1956, Serial No. 596,768

10 Claims. (Cl. 219—44)

The present invention relates to an adjustable control, and particularly to one which is well suited for use in an automatic electric coffee maker having two or more heating units, the circuits for which are to be separately controlled. The coffee maker application of the invention will be specifically illustrated and described, however, it should be understood that the invention is not limited thereto, but may be used in connection with other electric heating or cooking devices.

The object of the invention is to provide an adjustable control for controlling two or more heating circuits which is a simple, compact structure adapted to be readily incorporated in a coffee maker or the like, and which is reliable in operation and capable of being manufactured at low cost.

According to one form of the invention the control comprises a bimetallic strip which is secured at its central point to a heat source to thereby allow both of its ends to freely deflect away from the heat source upon an increase in temperature, an assembly associated with the bimetallic strip and comprising two sets of electrical contacts and their supporting switch blades, and means for adjusting the assembly in a plane which is generally parallel to the surface of the bimetallic strip when the latter is undeflected, so as to alter the disposition of the assembly relative to the bimetallic strip.

The above and other objects, and further details of that which I believe to be novel and my invention, will be clear from the following description and claims taken with the accompanying drawing wherein:

Fig. 4 is a fragmentary, bottom elevation view of the control on an enlarged scale showing the control in several, representative positions of adjustment which it may assume, and the points at which the control lever must be set for various brew strengths and for reheating;

Fig. 5 is a sectional view taken on line 5—5 of Fig. 4;

Fig. 6 is a side elevation view of the control looking in the direction of the arrow $A^1$ in Fig. 4;

Fig. 7 is a sectional view taken substantially on line 7—7 of Fig. 4;

Fig. 8 is an elevation view with portions shown in section, looking in the direction of the arrow $A^2$ of Fig. 4, after the control has been adjusted to reheating position, and Fig. 9 is a view similar to Fig. 8 showing the control in position to brew strong coffee.

Figure 1:
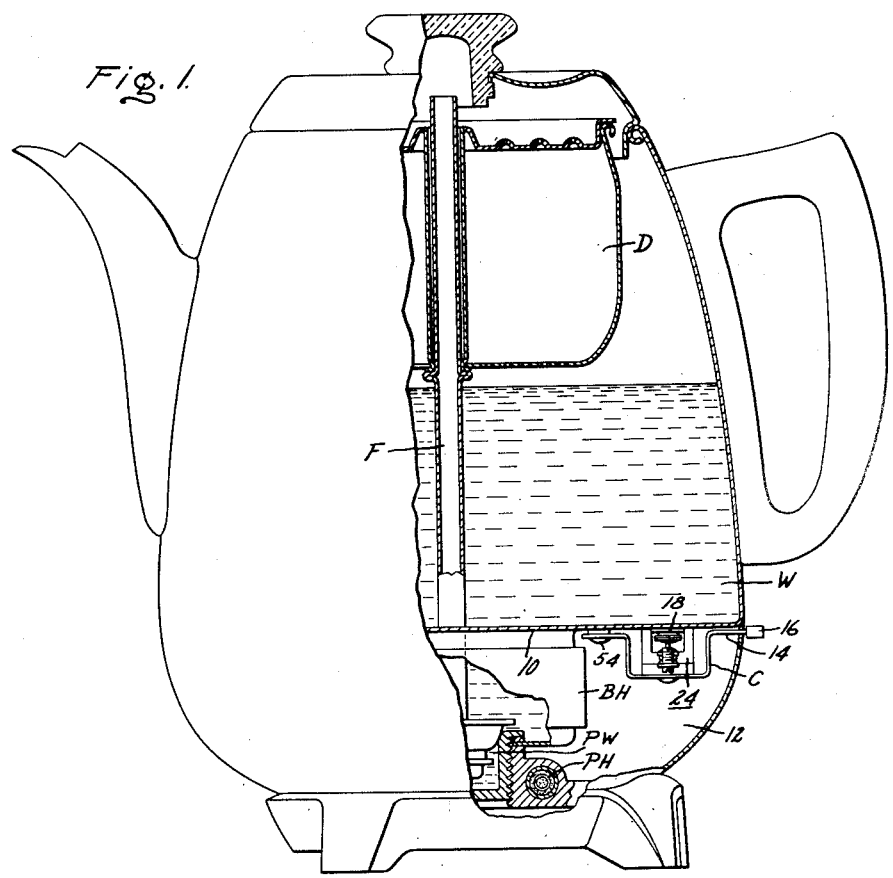
Fig. 1 is a sketch of an electric percolator incorporating the improved control, primarily for the purpose of showing the location of the control relative to the other percolator components.

The improved control is well adapted for use in an automatic, electric, coffee percolator wherein there are provided a booster heating unit for preheating the main body of water in the percolator prior to its entry into the pumping well, or reheating cold, previously brewed coffee, and a pump heating unit for heating water in the pumping well. Fig. 1 is a sketch somewhat schematically illustrating the improved control C incorporated in an electric coffee percolator. The booster heating unit BH is cylindrical and mounted so as to heat the main body W of water in the percolator to bring or assist in bringing this water up to a desired initial temperature prior to its being admitted into the pumping well PW. The pump heating unit PH is associated with the pumping well in such a manner that when it is energized it heats the water in the well until it forms steam and forces water up through the fountain tube F into the basket D which is adapted to contain ground coffee. When reheating cold, previously brewed coffee, solely the booster heating unit is energized, and repercolation is avoided.

The general construction and operation of the percolator, and the general disposition of the improved control C relative to the percolator are similar to those disclosed and claimed in application Serial No. 425,160, filed April 23, 1954, in the names of A. W. Lohrman and P. M. Kropp, Jr., now Patent No. 2,763,767, assigned to the assignee of the instant invention. Reference to that patent may be had for a more detailed disclosure of the percolator construction and operation, and the general disposition of the control. Due to the fact that the instant invention relates to an improved control which is particularly adapted to function as a brew control for an electric percolator, no further disclosure of the percolator construction will be made here, other than to point out that the percolator includes a generally horizontal wall 10 which separates an upper reservoir for the main body W of water, and a lower compartment 12 which houses the improved control and other components of the percolator. It should also be noted further that the improved control is mounted on the underside of the wall 10 and includes a control lever 14 which extends through a slot in a side wall of the percolator and has a control knob 16 secured at its free end.

Figure 2:
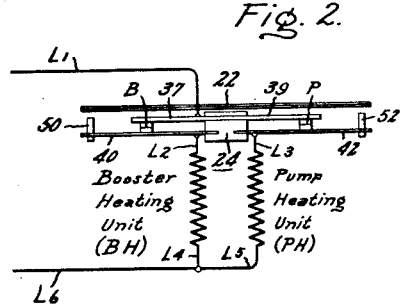
Fig. 2 is a diagram showing the electrical wiring of the percolator.

Fig. 2 illustrates a diagram of the electrical wiring of the percolator. It will be seen there that the booster heating unit BH and the pump heating unit PH are mounted in the circuit in parallel, and that each has a pair of switch blades associated with it which includes a set of electrical contacts, set B and set P, respectively. The sets of contacts are adapted to normally be engaged, but to be disengaged at a predetermined, appropriate time to deenergize the heating units individually to provide the desired brewing effect.

Figure 3:
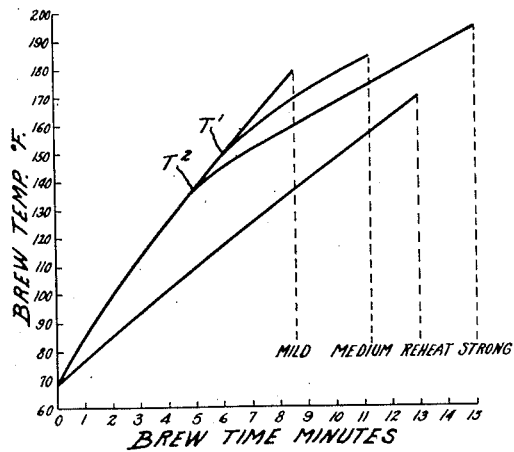
Fig. 3 is a graph illustrating the operation of the percolator.

Fig. 3 illustrates by a graph the manner in which different brew strengths may be achieved or reheating may be effected. On the graph, brew temperatures (temperatures of main body W of water) are plotted against brew time (time during which one or both heating units are energized); each of the curves shows an increase in brew temperature with increased brew time, and the ends of the curves indicate the temperature at which both sets of electrical contacts are open, hence, both heating units are deenergized. For the three curves marked, "Mild," "Medium" and "Strong," both the booster heating unit and pump heating unit are energized initially. For the curve marked "Mild," both sets of heating units are energized throughout the entire brewing period until both sets of electrical contacts are open when the same brew temperature is reached, indicated by the end of the "Mild" curve, which corresponds to a temperature of about 180° F., which is reached after a brew period of about eight minutes. For the curve marked "Medium," the set B of contacts, which controls the booster heating unit, is disengaged at a brew temperature indicated by T1 on the curve, approximately 150° F., and the set P of contacts, which controls the pump heating unit, is disengaged at a higher temperature corresponding to the end of the curve, approximately 185° F., after a brew period of about eleven and one-half minutes. For the curve marked "Strong," the set B of contacts is disengaged at a still lower brew temperature, indicated by T2 on the curve, approximately 140° F., and the set P of contacts is disengaged at a still higher temperature corresponding to the end of the curve, approximately 195° F., after a brew period of about fifteen minutes. The "Reheat" curve in the Fig. 2 graph indicates the manner of reheating cold, previously brewed coffee to a temperature of approximately 170° F., solely by the use of the booster heating unit.

It will be understood from a consideration of the Fig. 3 graph that by decreasing the brew temperature at the time when the booster heating unit is deenergized by disengagement of the contacts B, an increase in the length of the percolation period is obtained without having to increase the brew temperature at which the pump heating unit is deenergized to a very great extent. The idea of varying the temperature at which the booster heating unit is deenergized to vary the strength of the brew is not my invention, but is described and claimed in the copending application of Erle C. Sullivan, Serial No. 425,287, filed April 23, 1954, and assigned to the assignee of the instant application.

My invention contemplates providing an improved control for simultaneously varying the temperatures at which both the booster heating unit and the pump heating unit are deenergized, particularly in an inverse relationship, by disengaging their respective set of contacts at the proper time for the different brew settings. The improved control is illustrated in detail in Figs. 4 through 9. The underside of the percolator wall 10 has an elongated, depending rib 18 formed thereon. Rigidly secured to a central portion of the rib 18, by conventional securing means, such as the bolt 20, is an elongated bimetallic strip 22. As can best be seen in Fig. 7, the bimetallic strip 22 is secured at its central portion, extends in a plane which is generally parallel to the wall 10, when the bimetallic strip is undeflected, and has both of its ends mounted so as to be free and capable of deflecting in response to an increase in temperature. As viewed in Figs. 7, 8 and 9, the bimetallic strip is attached to the wall 10, which constitutes a heat source for the bimetallic strip, and has its high expansion side disposed on its upper surface so that its free ends deflect in a downward direction in response to an increase in temperature. On its lower side, and spaced to the left of bolt 20 as viewed particularly in Figs. 7 and 8, the bimetallic strip 22 supports a downwardly projecting button 23, the purpose of which will become apparent subsequently.

Slidably mounted on the rib 18 is a switch assembly 24. The switch assembly 24 comprises set B of booster contacts and set P of pump contacts, associated supporting switch blades and actuators, and a body for supporting all of the elements of the switch assembly to thereby provide a unitary switch assembly which is capable of sliding on rib 18 as a unit.

The switch assembly body is illustrated as being formed of two members, viz., upper body member 26 and lower body member 44, which are made of an electrical insulating material. Upper body member 26 is generally channel-shaped and has a pair of upwardly extending, spaced, parallel, side walls 28 and 30, the upper portions of which straddle the rib 18, and a central, generally horizontal web 32 which connects the side walls. Secured to the upper surface of the web 32 by the rivet 34 at its central point is an elongated switch blade member 36. The free ends of switch blade member 36 extend in opposite directions beyond the body 26 and each free end constitutes a separate switch blade and supports an electrical contact. As viewed in Fig. 7, the left-hand end 37 of the switch blade member 36 supports the upper contact of the set B of contacts, and the right-hand end 39 of the switch blade member 36 supports the upper contact of the set P of contacts. It will be understood that, if desired, two separate switch blades may be substituted for the single switch blade member 36. The illustrated single switch blade member comprises a convenient way of effectuating both switch blades. It will be noted from Figs. 5 and 7 that the lower surface of the web 32 has a recess 38 in which the rivet 34 is disposed. The upper end of the rivet 34 may function as an electrical terminal for both switch blades 37 and 39 by being connected to an electrical wire, such as L1 in the Fig. 2 wiring diagram.

Secured between the underside of the upper body member 26 and upper side of the lower body member 44 is a pair of separate switch blades 40 and 42. The lower body member 44, is secured to the upper body member 32 by the rivets 46 and 48 which pass through both body members and the switch blades 40 and 42, respectively. It will be noted in Fig. 7 that the rivet 46 passes through the switch blade 40, and the rivet 48 passes through the switch blade 42, and that the upper ends of both rivets are disposed in recesses in the upper surface of the upper body member 26 so as to never contact the switch blade member 36. The rivets 46 and 48 cooperate with the assembly parts which they assemble to form a unitary assembly comprising the body members 26 and 44, and the switch blades 37, 39, 40 and 42. When assembled the switch blades 40 and 42 extend in opposite directions in a plane which is generally parallel to and spaced from the plane of the switch blade member 36, are rigidly connected to the unitary assembly and carry the lower contacts of the booster set B and pump set P, respectively. The sets of contacts are normally in engagement, as shown in Fig. 7.

It will also be apparent from Fig. 7 that each of the switch blade members 40 and 42 extends beyond the adjacent end of the switch blade member 36, and that they support actuators 50 and 52, respectively. Each of the actuators 50 and 52 is made of an electrical insulating material, is threaded and is received in a threaded opening in its supporting switch blade, has an end which extends toward and is adapted to cooperate with an end of the bimetallic strip 22 which is adjacent to it, when the latter deflects, and has a kerf at its opposite end for individually adjusting the actuator relative to the threaded opening in which it is mounted so as to alter the distance between it and the adjacent end of the bimetallic strip.

Each of the rivets 46 and 48 is made of an electrical conducting material and is in good electrical contact with the switch blade which it mounts. The lower end of each of the rivets 46 and 48 may function as an electrical terminal and have connected to it an end of an electrical wire, which in the case of the rivet 46 would be connected at its other end to the booster heating unit, and in the case of the rivet 48 would have its other end connected to the pump heating unit. In the wiring diagram shown in Fig. 2, these electrical wires are respectively designated as L2 and L3. To complete the wiring, the booster heating unit has another electrical wire L4 which connects the booster heating unit with the wire L6, which is connected to a source of electricity, and the pump heating unit has an electrical wire L5, which is also connected to the wire L6. This completes the wiring of the percolator, and it will be understood that it is such that the booster heating unit and pump heating unit are normally mounted in parallel and energized, and that the booster heating unit may be deenergized by disengaging the set B of booster contacts, and the pump heating unit may be deenergized by disengaging the set P of pump contacts. It will be understood further that the improved control contemplated by the instant invention includes both the booster contacts B and the pump contacts P, and is so constructed as to permit simultaneous adjustment of the time when each of the sets of contacts is disengaged.

The assembly 24, just described in detail, is slidably mounted on rib 18, as was previously mentioned. In order to slidably mount the assembly on the rib 18 and retain it in operating relationship, and also to permit manual control of the position of the assembly relative to the bimetallic strip 22, which constitutes selecting a brew setting, a retaining and control lever 14 is provided. It will be recalled that with reference to the description of Fig. 1, control lever 14 was mentioned and was described as extending to the exterior of the percolator body and having a control knob 16 secured at its free end.

In Fig. 4 it will be seen that one end of control lever 14 is pivotally connected to the underside of wall 10 on the pivot bolt 54. It can be seen in Figs. 5 and 6 that the control lever 14 has a U-shaped bend spaced from its pivot point which partially surrounds assembly 24, the bight 56 of the U being provided with a slot 58 adjacent to the lower side of lower body member 44 of assembly 24. Located within the slot 58 is a pivot bolt 60, which is rigidly secured to the underside of the lower body member 44; the arrangement is such that relative movement between the slot 58 and bolt 60 is permitted. The control lever 14 secures the assembly 24 on the rib 18, and also provides a means for sliding the assembly on the rib to thereby alter the position of the assembly 24 relative to the bimetallic strip 22. This results in adjusting the brew setting of the control as will become apparent subsequently.

Movement of the assembly is effected by grasping the control knob 16 and moving the control lever relative to the percolator body. It can be seen in Fig. 4 that the lever 14 is pivotal between its dotted line position, designated "Reheat," and its dot-dash line position, designated "Strong." The solid line position of lever 14 is designated "Mild," and it will be understood that the lever may be stopped at any point intermediate the solid line position and dot-dash line position, for example, at the point designated "Medium." Normally, the lever would not be stopped between its solid line and dotted line positions. Pivotal movement of the lever 14 results in sliding movement of the assembly 24 on the rib 18, and the resultant adjustment of the brew setting, the motion translation being effected by the pin 60 and slot 58 connection. It will be understood that a portion of the percolator body which is adjacent to the slot through which the lever 14 extends may be marked with suitable indicia indicating various strengths of brew, such as "Mild," "Medium," "Strong" and also a "Reheat" position, and that movement of the control knob 16 to the desired position will result in sliding the assembly 24 relative to bimetallic strip 22 and adjusting the control so as to automatically produce the desired strength of brew.

The control operates in the following manner to control energization of the heating units and thereby control the brew made in the percolator. Fig. 7 may be considered to represent the "Mild" setting. Assuming the actuators 50 and 52 are spaced an equal distance from the ends of the bimetallic strip 22 which are adjacent to them, upon an increase in temperature, the ends of the bimetallic strip 22 will deflect downwardly and ultimately contact the ends of the actuators and thereafter move the switch blades 40 and 42 away from the switch blades 37 and 39, respectively, and ultimately disengage both sets of contacts; the parts of the control are designed to effect this contact separation when the main body W of water reaches a temperature of approximately 180° F. By reference to the discussion of the Fig. 2 graph, it will be seen that when both sets of contacts are disengaged at the same time, both heating units are deenergized simultaneously and "Mild" brew is made. Since in the Fig. 7 position, the assembly 24 is spaced midway between the ends of the bimetallic strip 22, and the actuators are spaced an equal distance from said ends, an equivalent amount of deflection of the ends of bimetallic strip 22 must take place before the actuators are contacted (the dotted line position of the bimetallic strip ends shown in Fig. 7), hence the sets of contacts are disengaged simultaneously. The "Mild" setting condition is such that when the control is so adjusted, the control knob 16 is located adjacent the indicia "Mild" on the percolator body.

If it is desired to increase the strength of the brew, let us say to "Strong," it will be necessary to adjust the control in such a manner that the booster heating unit will be deenergized after the main body W of water reaches a temperature of about 140° F., and to deenergize the pump heating unit at approximately 195° F. This control setting is affected by moving the control knob 16 to the "Strong" position (dot-dash position in Fig. 4), which will result in the assembly 24 being moved to the position illustrated in Fig. 9. When disposed in this position, the set B of booster contacts will be disengaged before the set P of pump contacts, because the actuator 50 is disposed adjacent to a portion of its associated end of the bimetallic strip 22 which is farther away from the point of securement of the bimetallic strip 22 to the wall 10 than portion of the other end of the bimetallic strip which is adjacent to the actuator 52. On an increase in temperature, the deflection in the free ends of the bimetallic strip is uniform, however, greater vertical movement occurs at the portion of the bimetallic strip end which is adjacent to the actuator 50 than that which occurs at the portion of the bimetallic strip end that is adjacent to the actuator 52. This obtains because of the known deflection characteristics of a cantilevered bimetallic strip; the farther a portion on the bimetallic member is from the point of securement, the greater distance it will deflect. Therefore, actuator 50 will be contacted by the bimetallic strip before the actuator 52; this is the dot-dash line position in Fig. 9. Slight additional deflection will result in disengagement of set B of the booster contacts, resulting in deenergization of the booster heating unit. However, the pump heating unit is still energized, and the bimetallic member will continue to increase in temperature and deflect; ultimately enough vertically downward movement of the portion of the end of the bimetallic strip adjacent to the actuator 52 will occur so that said portion will contact actuator 52 (the dotted line position in Fig. 9), and move it downwardly to disengage the set P of pump contacts to thereby deenergize the pump heating unit. The parts of the control are designed so that set B of contacts is disengaged at 140° F., and set P of contacts is disengaged at 195° F. When both sets of contacts are disengaged, the coffee will be brewed to the desired "Strong" strength.

Between the "Mild" setting and "Strong" setting there are an infinite number of settings, however, one intermediate point is designated "Medium" and it will be realized that in this setting the booster heating unit will be deenergized at approximately 150° F. and the pump heating unit will be deenergized at approximately 185° F. The location of the control parts at the "Medium" setting has not been illustrated, however, it will be understood that the assembly 24 will be located relative to the bimetallic strip 22 somewhere between the "Mild" Fig. 7 disposition and the "Strong" Fig. 9 disposition. In other words, the assembly 24 will be to the left of where it is located in Fig. 7, and to the right of where it is located in Fig. 9.

In effecting reheating of previously brewed coffee which has been allowed to cool, it is, of course, desirable not to repercolate the brew, it being desirable solely to rewarm it. From the Fig. 2 graph, it will be seen that the "Reheat" curve is substantially a straight line, and the maximum brew temperature reached will be approximately 170° F., this is the temperature to which the control will warm up and cycle about. As was mentioned, in reheating the brew, the pump heating unit is not utilized at all and solely the booster heating unit is energized, therefore, in the Fig. 2 graph, the "Reheat" curve reflects the action of the booster heating unit alone.

Fig. 8 illustrate the "Reheat" setting of the control and Fig. 4 illustrates the "Reheat" position of the control lever 14 and knob 16 in dotted lines. As viewed in these figures, at the right of the control there is mounted a stop 62 which is rigidly connected to the underside of the wall 10. Stop 62 has an inclined face 64, which on movement of the control knob 16 to the "Reheat" position and the resultant movement of the assembly 24 to the right relative to the bimetallic strip 22, is contacted by the actuator 52, which rides up on surface 64 and disengages the set P of the pump contacts. The stop 62, therefore, deenergizes the pump heating unit at the outset and prevents engagement of the set P of pump contacts under any conditions when the control is in the "Reheat" setting. Movement of the control lever 14 to the "Reheat" position also results in the actuator 50 being moved to a position relative to the bimetallic strip wherein it is directly under the button 23. The button 23 reduces the gap between the bimetallic strip and the actuator 50 to such an extent that the temperature in the main body W of water must rise only to approximately 170° F. before enough deflection will occur in portion of the bimetallic strip which supports button 23 to move said button into contact with the actuator and disengage set B of booster contacts. It will be noted that the absence of the button 23 would result in the booster contacts being disengaged at a temperature in excess of that for the "Mild" setting, approximately 180° F., for the actuator 50 is located to the right of its "Mild" position, shown in Fig. 7, when it is in its "Reheat" position, shown in Fig. 8. Since this temperature would be much higher than is necessary for reheated brew, the button 23 is employed to cause the set B of booster contacts to disengage at approximately 170° F.

It will be understood that the precise size and disposition of the various components of the control, and the particular materials used, are selected in a known manner so as to produce the operating characteristics set forth in the Fig. 2 graph. Although the control has been described in operation with the actuators 50 and 52 spaced an equal distance from the bimetallic strip 22, it will be understood that the actuators may be individually adjusted so as to vary this distance and thereby alter the temperature at which the actuators are moved by the bimetallic strip; this renders the control operative over a large range of temperatures and with variable characteristics. This obtains, because for any given setting, the temperature at which a given set of contacts is disengaged is determined by (1) the distance its associated actuator is spaced from the bimetallic strip and, (2) the distance the portion of the bimetallic strip which contacts said actuator is from the point of securement of said bimetallic strip. To illustrate this, although Fig. 7 illustrates the "Mild" setting when the actuators are equally spaced from the bimetallic strip, if desired, a mild setting may be effectuated by moving actuator 50 farther from the bimetallic strip than actuator 52, and moving the assembly 24 to the left so that actuator 50 is adjacent to a portion of bimetallic strip 22 which is farther from the point of securement of said strip than the portion of said strip which is adjacent to actuator 52. The cumulative effect of this setting is to disengage both sets of contacts simultaneously, for although actuator 50 is farther from strip 22 than actuator 52, it is adjacent to a portion of the strip which moves a greater distance than the portion which is adjacent actuator 52 during a fixed period. If the actuators are adjusted in this manner, the entire operation of the control will be effected, and each brew setting will have to be ascertained empirically as to the precise location of the assembly 24 relative to the bimetallic strip for each setting, and appropriate changes in lever positions noted and indicated by changing the setting indicia. It will be appreciated that adjustment of the actuators is a calibrating operation, after the control has once been initially designed to function in a particular manner, and that such adjustment is normally not made by a user of the percolator.

Although not previously mentioned, a "keep warm" heating unit may be incorporated into the percolator to keep the brew warm after it is made, and a visible signal, such as a light, may be energized when the brew is ready; these elements may be added with appropriate changes in the wiring, in any known manner.

The control has been disclosed as being incorporated in an electric percolator, however, it will be apparent that it may be utilized wherever two circuits are controlled and affected at different temperatures. The control is compact, readily manufactured and assembled, reliable in operation and, therefore, inexpensive, but effective for its intended purposes.

As will be evident from the foregoing description, certain aspects of my invention are not limited to the particular details of construction of the example illustrated, and I contemplate that various and other modifications and applications will occur to those skilled in the art. It is, therefore, my intention that the appended claims shall cover such modifications and applications as do not depart from the true spirit and scope of my invention.

What I claim as new and desire to secure by Letters Patent of the United States is:

1. A control comprising an elongated temperature responsive member secured at its central portion to a heat source and having ends adapted to deflect in response to a temperature increase in said heat source, and a switch assembly disposed adjacent to said temperature responsive member and mounted for movement longitudinally relative thereto, said switch assembly comprising a plurality of pairs of switch blades, each pair having a set of electrical contacts which is adapted to normally be engaged, but to be disengaged by movement of one blade of the pair with respect to the other, each of said ends on deflecting adapted to move one of said movable blades to disengage the contacts, the temperature at which each of said movable blades is moved and its associated set of contacts disengaged depending upon the disposition of said switch assembly relative to said temperature responsive member.

2. A device as defined in claim 1 wherein said pairs of switch blades extend in opposite directions and each pair carries a set of contacts near its free end, and said pairs are spaced from and generally parallel to said temperature responsive member.

3. A device as defined in claim 1 wherein said movable blade of each pair supports an actuator which extends toward said temperature responsive member and is engaged and moved by one of said ends on deflection of the latter to disengage the actuator's associated set of contacts, the temperature at which each set of contacts is disengaged depending upon the distance between said set's associated actuator and said temperature responsive member, and the distance between the portion of the end which contacts said set's associated actuator and the central portion of said temperature responsive member, whereby after once fixing the former distances, the latter distances may be simultaneously altered by moving said switch assembly relative to said temperature responsive member to alter the temperature at which each set of contacts will be disengaged.

4. A device as defined in claim 3 wherein said actuators are adjustably mounted in their supporting switch blades and adapted to be spaced at any distance from said portions within their range of adjustment to thereby alter the temperature at which their associated set of contacts is disengaged.

5. A device as defined in claim 1 wherein a stop is provided which contacts and moves one of said movable blades when said switch assembly is moved to one position relative to said temperature responsive member, to thereby disengage said one blade's associated set of contacts.

6. A device as defined in claim 1 wherein means is provided for moving said switch assembly relative to said temperature responsive member.

7. In combination, an electric percolator having a booster heating unit and a pump heating unit, a control for controlling the circuits for said heating units comprising an elongated, temperature responsive member secured at its central portion in said percolator so as to respond to the temperature of the brew in said percolator and having ends that are adapted to deflect in response to an increase in said temperature, a switch assembly mounted for longitudinal movement relative to said temperature responsive member, said switch assembly comprising two pairs of switch blades, each pair having a set of electrical contacts, one of said sets adapted to control the booster heating unit circuit and the other set adapted to control the pump heating unit circuit, each of said sets being adapted to be disengaged by movement of one blade of said set's pair with respect to the other, said ends on deflecting adapted to move said one blade of each pair to disengage said sets of contacts, the temperature of which each set of contacts is disengaged depending upon the relative disposition of said temperature responsive member and said switch assembly, whereby the temperature at which each of the circuits of said heating units is opened may be simultaneously altered by moving said switch assembly relative to said temperature responsive member.

8. A device as defined in claim 7 wherein a stop is provided which contacts the movable blade associated with the set of contacts which controls the pump heating circuit when the switch assembly is moved to one position to thereby disengage said set of contacts and prevent energization of the pump heating unit during operation of the percolator when the control is in this position.

9. A device as defined in claim 8 wherein a button is supported by said temperature responsive member in position to reduce the distance between the point on the movable blade associated with the set of contacts which controls the booster heating circuit which is contacted by said temperature responsive member when said movable blade is moved, and said temperature responsive member when said switch assembly is in said one position.

10. A device as defined in claim 7 wherein means is provided for moving said switch assembly relative to said temperature responsive member, said means being accessible from the exterior of the percolator.

References Cited in the file of this patent

UNITED STATES PATENTS

| Number | Name | Date |
|---|---|---|
| 2,223,450 | Jepson et al. | Dec. 3, 1940 |
| 2,402,354 | Waddell | June 18, 1946 |
| 2,504,728 | Purpura | Apr. 18, 1950 |
| 2,526,566 | Kolisch | Oct. 17, 1950 |
| 2,527,875 | Bruhn | Oct. 31, 1950 |
| 2,622,186 | Hutchens | Dec. 16, 1952 |
| 2,657,300 | Sullivan | Oct. 27, 1953 |
| 2,741,682 | Schwaneke et al. | Apr. 10, 1956 |
| 2,743,333 | Epstein | Apr. 24, 1956 |
| 2,754,399 | Edman | July 10, 1956 |
| 2,763,767 | Lohrman et al. | Sept. 18, 1956 |